(12) United States Patent
Smith et al.

(10) Patent No.: US 7,624,254 B2
(45) Date of Patent: Nov. 24, 2009

(54) SEGMENTED PIPELINE FLUSHING FOR MISPREDICTED BRANCHES

(75) Inventors: Rodney Wayne Smith, Raleigh, NC (US); James Norris Dieffenderfer, Apex, NC (US); Michael Scott McIlvaine, Raleigh, NC (US); Thomas Andrew Sartorius, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 192 days.

(21) Appl. No.: 11/626,443

(22) Filed: Jan. 24, 2007

(65) Prior Publication Data

US 2008/0177992 A1    Jul. 24, 2008

(51) Int. Cl.
*G06F 9/38* (2006.01)

(52) U.S. Cl. .................. 712/216; 712/239; 712/217; 712/218; 712/219

(58) Field of Classification Search ......... 712/216–219, 712/233–241
See application file for complete search history.

(56) References Cited

U.S. PATENT DOCUMENTS 5,586,278 A    12/1996    Papworth
5,627,985 A    5/1997    Fetterman
5,812,839 A    9/1998    Hoyt

FOREIGN PATENT DOCUMENTS

EP    0649086    4/1995

OTHER PUBLICATIONS

Akkary et al., Checkpoint Processing and Recovery: Toward Scalable Large Instruction Window Processors, Proceedings of the 36th Annual IEEE/ACM International Symposium on Microarchitecture, 2003, pp. 423-434.*
International Search Report-PCT/US08/051966, International Search Authority-European Patent Office May 20, 2008.
Written Opinion-Pct/Us08/051966, International Search Authority-European Patent Office May 20, 2008.

* cited by examiner

*Primary Examiner*—William M Treat

(57) ABSTRACT

A processor pipeline is segmented into an upper portion—prior to instructions going out of program order—and one or more lower portions beyond the upper portion. The upper pipeline is flushed upon detecting that a branch instruction was mispredicted, minimizing the delay in fetching of instructions from the correct branch target address. The lower pipelines may continue execution until the mispredicted branch instruction confirms, at which time all uncommitted instructions are flushed from the lower pipelines. Existing exception pipeline flushing mechanisms may be utilized, by adding a mispredicted branch identifier, reducing the complexity and hardware cost of flushing the lower pipelines.

1 Claim, 2 Drawing Sheets

SEGMENTED PIPELINE FLUSHING FOR MISPREDICTED BRANCHES

BACKGROUND

The present invention relates generally to branch prediction in pipelined processors, and in particular to a system and method of independently flushing two segments of the same pipeline at different times to maximize performance and efficiently correct mispredicted branch instructions.

Most modern processors employ a pipelined architecture, where sequential instructions, each having multiple execution steps, are overlapped in execution. For maximum performance, the instructions should flow continuously through the pipeline. However, instructions often become stalled in the pipeline for a variety of reasons, such as data dependencies between instructions, delays associated with memory accesses, an inability to allocate sufficient pipeline resources to instructions, and the like. Minimizing pipeline stalls and resolving them efficiently are important factors in achieving improved processor performance.

Most real-world programs include conditional branch instructions, the actual branching behavior of which is not known until the instruction is evaluated deep in the pipeline. Most modern processors employ various forms of branch prediction, whereby the branching behavior of conditional branch instructions is predicted early in the pipeline, and the processor fetches and speculatively executes instructions, speculatively allocating pipeline resources to them, based on the branch prediction. When the actual branch behavior is determined, if the branch was mispredicted, the speculatively fetched instructions must be flushed from the pipeline, speculatively allocated resources must be un-allocated and returned to their state prior to the branch prediction, and new instructions must be fetched from the correct branch target address.

On one hand, the pipeline should ideally be flushed immediately upon detecting the misprediction, so that the correct instructions may be fetched and launched into the pipeline, minimizing the delay caused by the branch misprediction. On the other hand, instructions fetched from the erroneous branch path may be in various stages of speculative execution, and may have been speculatively allocated various processor resources. Immediately "unwinding" these allocations to restore the resources to their pre-branch-prediction state is difficult, and may incur numerous processor cycles and/or require numerous duplicative copies of the speculatively-allocated resources. The penalties incurred by immediately flushing the pipeline are further exacerbated in processors that support out of order instruction execution, such as superscalar processors, due to the additional challenge of tracking relative instruction age. This instruction age tracking is necessary to ensure that only those instructions that were fetched after the mispredicted branch instruction (in program order) are flushed, and that all instructions ahead of the branch instruction (in program order) are executed, even though they may be behind the branch instruction in the pipeline.

SUMMARY

Upon the determination of a branch misprediction, a processor may ease the task of flushing its pipeline of erroneously fetched and speculatively executed instructions by continuing normal execution for (ideally) only several cycles, and utilizing existing hardware that handles pipeline flushes in the event of exceptions. This process may dramatically reduce the cost and complexity of flushing the pipeline in response to the branch misprediction. However, the extra delay incurred is counter to the goal of immediately flushing the pipeline to quickly fetch instructions from the correct branch target address.

According to one or more embodiments, an upper portion of the pipeline—prior to instructions going out of program order—is flushed immediately upon detecting that a branch instruction was mispredicted, allowing for immediate fetching of instructions from the correct branch target address. Each lower portion of the pipeline may continue execution until the mispredicted branch instruction confirms, at which time all uncommitted instructions are flushed from the lower pipeline. Existing exception pipeline flushing mechanisms may be utilized, by adding a mispredicted branch identifier, reducing the complexity and hardware cost of flushing the lower pipeline.

One embodiment relates to a method of executing instructions in a pipelined processor that allows out of order execution. Upon detecting a branch instruction misprediction, an upper pipeline, i.e., the portion of the pipeline prior to a point at which instructions may be out of program order, is flushed. Upon committing the mispredicted branch instruction for execution, all uncommitted instructions are flushed from a lower pipeline, i.e., the portion of the pipeline beyond which instructions may be out of program order.

Another embodiment relates to a processor. The processor includes control logic, and a segmented instruction execution pipeline comprising an upper pipeline prior to the point at which instructions may be out of order, and one or more lower pipelines beyond the point at which instructions may be out of order. The control logic is operative to flush all instructions from the upper pipeline upon detecting a mispredicted branch, and is further operative to flush all uncommitted instructions from the lower pipelines upon committing the mispredicted branch instruction for execution.

DETAILED DESCRIPTION

Figure 1:
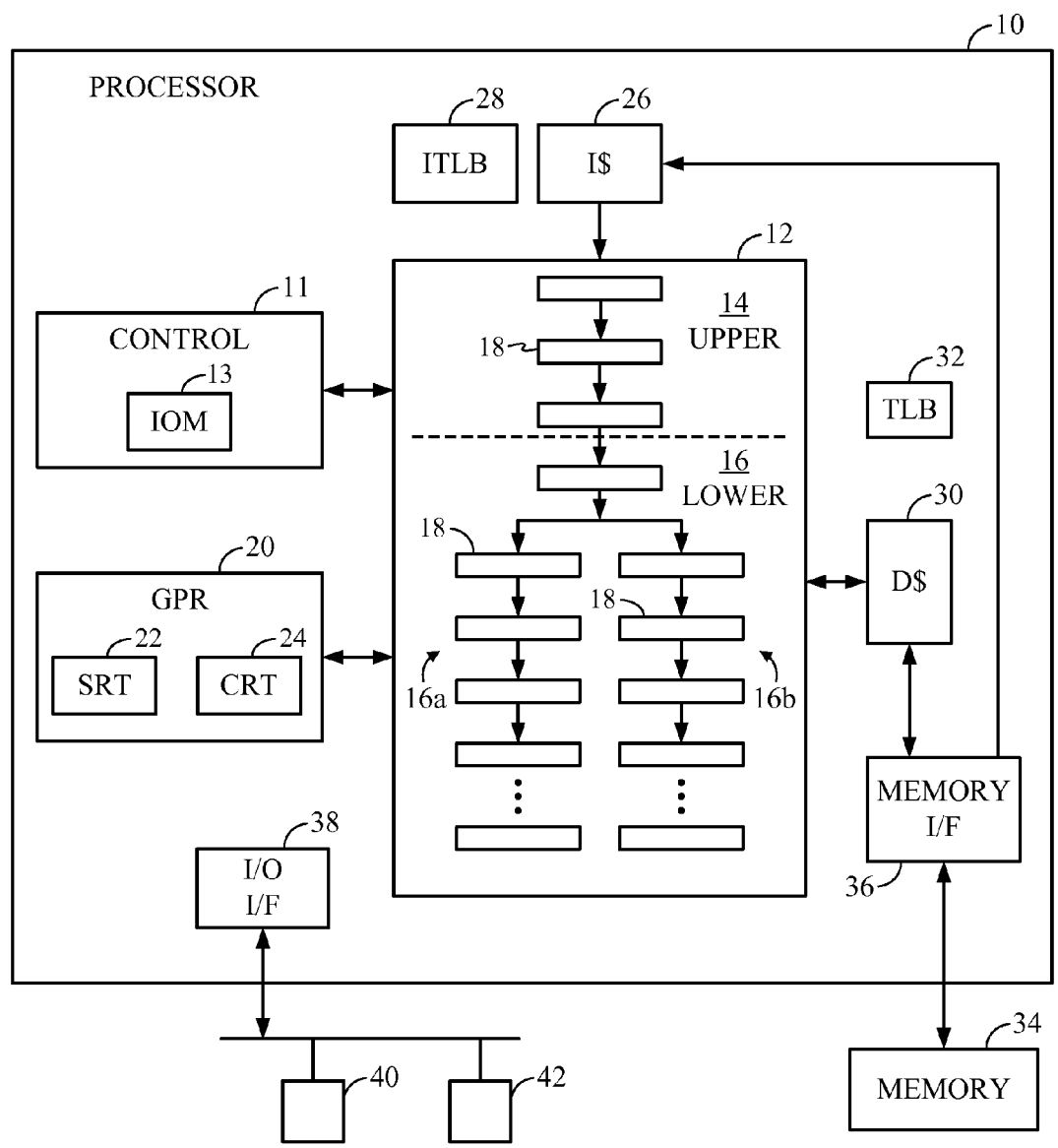
FIG. 1 is a functional block diagram of one embodiment of a superscalar pipelined processor having segmented pipeline flushing for branch mispredictions.

FIG. 1 depicts a functional block diagram of a processor 10 having segmented pipeline flushing for branch mispredictions. The processor 10 executes instructions in an instruction execution pipeline 12 according to control logic 11, which includes an Instruction Ordering Mechanism (IOM) 13. The pipeline 12 is logically divided, as explained in greater detail herein, into an upper portion 14 and a lower portion 16. The pipeline 12 may be a superscalar design, with multiple parallel lower pipelines 16a, 16b. The pipelines 14, 16 include various registers or latches 18, organized in pipe stages, as well as logical and computational circuits such as Arithmetic Logic Units (ALU) (not shown). A General Purpose Register (GPR) file 20 provides registers comprising the top of the memory hierarchy. As discussed herein, the GPR 20 may include a Speculative Renaming Table (SRT) 22 and a Committed Renaming Table (CTR) 24 to speculatively allocate GPR resources to instructions.

The upper pipeline 14 fetches instructions from an Instruction Cache (I-Cache or I$) 26, with memory addressing and permissions managed by an Instruction-side Translation Lookaside Buffer (ITLB) 28. Data is accessed from a Data Cache (D-Cache or D$) 30, with memory addressing and permissions managed by a main Translation Lookaside Buffer (TLB) 32. In various embodiments, the ITLB 28 may comprise a copy of part of the TLB 32. Alternatively, the ITLB 28 and TLB 32 may be integrated. Similarly, in various embodiments of the processor 10, the I-cache 26 and D-cache 30 may be unified.

Misses in the I-cache 28 and/or the D-cache 30 cause an access to main (off-chip) memory 34, under the control of a memory interface 36 (other caches, not shown, may be interposed between the processor 10 and main memory 34). The processor 10 may include an Input/Output (I/O) interface 38, controlling access to various peripheral devices 40, 42. Those of skill in the art will recognize that numerous variations of the processor 10 are possible. For example, the processor 10 may include a second-level (L2) cache for either or both the I and D caches 26, 30. In addition, one or more of the functional blocks depicted in the processor 10 may be omitted from a particular embodiment.

The logical division of the pipeline 12 into an upper pipeline 14 and one or more lower pipelines 16 is determined by the certainty with which instructions may be immediately flushed from the upper pipeline 14, without concern for instruction order. In particular, the upper pipeline 14 is defined as the portion of the pipeline 12 prior to the point at which instructions may go out of program order. Similarly, the lower pipeline 16 is defined as the portion of the pipeline 12 beyond or following the upper pipeline 14. In processors that support out-of-order execution, instructions in the lower pipeline 16 may be dispatched to pipe stages in other than their program order. In most embodiments, the upper pipeline 14 will comprise all fetch and decode stages, and the lower pipeline 16 includes an instruction issue stage (in the case of a superscalar pipeline) and one or more execution pipelines.

This logical division of the pipeline 12 allows the upper pipeline 14 to be flushed immediately upon detecting a branch misprediction, thus minimizing the time required to fetch instructions from the correct branch target address. It additionally allows the lower pipeline 14 to continue execution, thus taking advantage of existing exception flushing mechanisms to efficiently flush the lower pipeline 14 of all instructions speculatively fetched after the mispredicted branch.

The upper pipeline 14 flush is straightforward. Because the upper pipeline 14 is defined as being prior to the point at which instructions may go out of program order, and the mispredicted branch determination occurs in an execute stage in the lower pipeline 16, it is known that all instructions in the upper pipeline 40 at the time of the misprediction determination are newer than the mispredicted branch instruction. That is, they were all fetched in reliance on the branch prediction, and may all safely be flushed, such as in the cycle following detection of the mispredicted branch. This allows the processor 10 to begin fetching instructions from the correct branch target address as soon as possible, minimizing the pipeline stall duration.

Flushing the lower pipeline 16 is more problematic. Because instructions may be executing out of program order, it cannot be assumed that all instructions behind the mispredicted branch in the pipeline are newer than the mispredicted branch instruction and are safe to flush. For example, consider the following instructions: LD, ADD, BR, where the LD provides an operand for the ADD, but the BR is independent of either. The LD operation requires a memory access, which may stall the pipeline 16, particularly in the case of a D-cache 30 miss. The ADD, of course, must wait for the LD to complete. However, the independent BR instruction may be dispatched into a lower pipeline 16 for execution ahead of the LD and ADD. If the BR condition evaluation detects that it was mispredicted, the processor cannot simply flush the lower pipeline 16 behind the BR instruction. That would flush the LD and ADD, both of which precede the BR in program order, and must be executed.

Most superscalar processors 10 include an Instruction Order Manager (IOM) as part of the pipeline control logic 11. An IOM tracks the order of instruction execution through the pipeline—that is, which instructions are older or newer than a given instruction—by maintaining representations of instructions in true program order, such as in a circular buffer, FIFO, or the like. Through attributes or flags associated with the instruction representations, an IOM additionally tracks instruction dependencies, and is instrumental in exception handling. According to one or more embodiments, the IOM 13 in processor 10 includes additional circuits and logic that facilitate efficiently flushing the lower pipeline upon discovery of a mispredicted branch instruction. A brief review of the role of the IOM 13 in exception handling will illuminate mispredicted branch flushing of the lower pipeline 16 according to embodiments disclosed and claimed herein.

An exception occurs whenever a pipe stage is unable to complete its execution of an instruction step. For example, a store instruction writing data to memory may cause an exception if a TLB 32 look-up indicates that the memory page is read-only. Other types of exceptions are well known in the art. Upon encountering an exception, the processor 10 must execute all prior, or older, instructions in the pipeline 12; flush the exception-causing instruction and all newer instructions from the pipeline 12; and then fetch and execute interrupt-handling code. The IOM 13 assists in this process by tracking which instructions are "confirmed" and which are "committed."

An instruction is confirmed when it is determined that no pipeline hazards will impede its execution—that is, the instruction will not stall. For example, an instruction performing an arithmetic or logical operation may be confirmed when both operands are known to have been generated from previous instructions, fetched from memory, or are otherwise available. An instruction is committed when that instruction—and all older instructions—are confirmed. A committed instruction is known to be able to complete execution, as no pipeline hazards impede either it (the instruction itself is confirmed) or any instruction ahead of it (all older instructions are confirmed). All committed instructions must execute.

The conventional rule during exception handling is that all uncommitted instructions are flushed from the pipeline 12 when the exception-causing instruction is the "last uncommitted instruction." That is, all instructions prior to the exception-causing instruction have been committed for execution, but the exception-causing instruction, and all those newer than it, have not. The uncommitted instructions (including the one causing the exception) are flushed, and the committed instructions continue execution. New instructions are fetched from an interrupt handler address.

Unlike an exception-causing instruction, a mispredicted branch instruction must be executed and not flushed. Only the branch prediction was erroneous—the branch instruction itself must execute, and direct program flow to the proper branch target address. Accordingly, all uncommitted instructions are flushed from all lower pipelines 16a, 16b when the mispredicted branch instruction is the "newest committed instruction." That is, the mispredicted branch instruction and all instructions prior to it have been committed for execution, but all instructions following the branch (those fetched from the erroneously predicted branch target address), have not committed. The uncommitted instructions are flushed, and the committed instructions (including the mispredicted branch instruction) continue execution.

In one or more embodiments, each entry in the IOM 13 includes a mispredicted branch (MPB) flag or bit field, which is initialized to a non-asserted state when the IOM 13 entry is created. A branch instruction will normally confirm immediately after its branch evaluation, as it has no other data dependencies. A confirmation pipe stage follows the branch condition evaluation stage in each pipeline 16a, 16b in which branch instructions are executed, and sets a confirmed flag in the IOM 13. The confirmation pipe stage additionally compares the branch evaluation with its predicted value, and also sets the MPB flag in the IOM 13 if the branch was mispredicted. Upon encountering the MPB flag when committing instructions for execution, the IOM 13 and associated control logic 11 may implement a lower pipeline 16 flush according to the "newest committed instruction" rule described above.

The delay from misprediction detection to confirmation and commitment of the mispredicted branch instruction in the IOM 13 should normally take only a few cycles. Meanwhile, the immediate flush of the upper pipeline 14 means that instruction fetching from the correct branch target address has already begun. In some cases, such as the LD, ADD, BR example described above, there may be a significant delay between detection of the branch misprediction and confirmation of the branch instruction, which enables the lower pipeline 16 flush. As a precaution against the possibility that flushing the lower pipeline 16 takes more cycles then, e.g., the depth of the upper pipeline 14, a pipeline hold may be placed at or before the boundary between the upper pipeline 14 and the lower pipeline 16. The hold, which is removed when the flush of the lower pipeline 16 is complete, prevents erroneously flushing any instructions fetched from the correct branch target address. Conditional pipeline holds are well known in the art, and may be readily implemented by those of skill in the alert without further explication herein.

Another complication in flushing the lower pipeline 16 is restoring the correct state of speculatively allocated processor resources following the flush. For example, register renaming is a known method of GPR 20 management wherein logical GPR identifiers (r0, r1, r2, . . . ) are dynamically mapped to a large set of physical registers via mappings in a renaming table. Register renaming systems avoid many of the data hazards inherent in out of order instruction execution. In operation, a new physical register is allocated, and a new logical-to-physical "renaming" is recorded in the renaming table, for every instruction that writes a GPR 20 register. Instructions that read a GPR 20 translate their logical GPR identifier to a physical register number via a renaming table lookup. The physical register number remains associated with the register-reading instruction throughout its tenure through the pipeline 16.

In a register renaming system, GPR 20 writes do not "corrupt" prior values written to the same logical GPR identifier; the write is directed to a new, unused physical register. Instructions that follow the writing instruction in program order are directed to the new physical register, and obtain the written value. Instructions preceding the writing instruction in program order were mapped by the renaming table to a different physical register (prior to the renaming operation), and will continue to access that physical register. Thus, instructions that write a given GPR identifier may be executed ahead of instructions that read a prior value from that GPR identifier (Write after Read hazard, or WaR) or write a prior result to it (Write after Write hazard, or WaW). In this manner, the WaR and WaW data hazards are avoided.

The renaming of logical GPR identifiers to physical registers is a speculative allocation of processor resources. Because instructions may execute out of order, an instruction may write a logical GPR identifier (and be allocated a new physical register) before the execution of another instruction that precedes the writing instruction in program order. If the other instruction causes an exception or is a mispredicted branch instruction, the writing instruction may be flushed from the pipeline 16 and its physical register de-allocated. On the other hand, register renamings that preceded the writing instruction must be preserved.

To be able to flush the lower pipeline 16 at any time (such as immediately upon detecting a mispredicted branch) and recover, a separate copy of the renaming table must be created every time a logical GPR identifier is renamed to a physical register—i.e., every time a register-writing instruction is launched into the pipeline 16—and the copy must be maintained until the register-writing instruction commits for execution. These register tables may then be selectively discarded, based on which instructions are flushed from the pipeline 16. This approach is expensive, both in maintaining numerous copies of renaming tables, and in the logic tracking which renaming tables must be discarded when flushing the pipeline 16.

In one or more embodiments, only two copies of a renaming table are maintained—a Speculative Renaming Table (SRT) 22 and a Committed Renaming Table (CRT) 24. The SRT 22 is updated every time a logical GPR identifier is renamed to a new physical register. Register rename mappings in the CRT 24 are only updated when the relevant register-writing instructions are committed for execution. When the lower pipeline 16 is flushed due to a mispredicted branch, since the mispredicted branch instruction is the newest committed instruction, it is known that all register-writing instructions that committed ahead of the branch (in program order) have their register rename mappings recorded in the CRT 24. Furthermore, it is known that any register renaming performed by register-writing instructions that followed the mispredicted branch instruction (in program order) is recorded only in the SRT 22 and is not recorded in the CRT 24. These register renamings should be discarded and the associated physical registers de-allocated as part of the lower pipeline 16 flush.

In one or more embodiments, when the lower pipeline 16 is flushed due to a mispredicted branch when the mispredicted branch instruction is the newest committed instruction, the CRT 24 is copied to the SRT 22. This places the SRT 22 in the correct state as of the mispredicted branch instruction, and de-allocates physical registers that were speculatively allocated to flushed register-writing instructions. By maintaining only two renaming tables and deferring flushing the lower pipeline 16 until the mispredicted branch instruction commits, the task of de-allocating speculatively allocated processor resources is greatly simplified.

Figure 2:
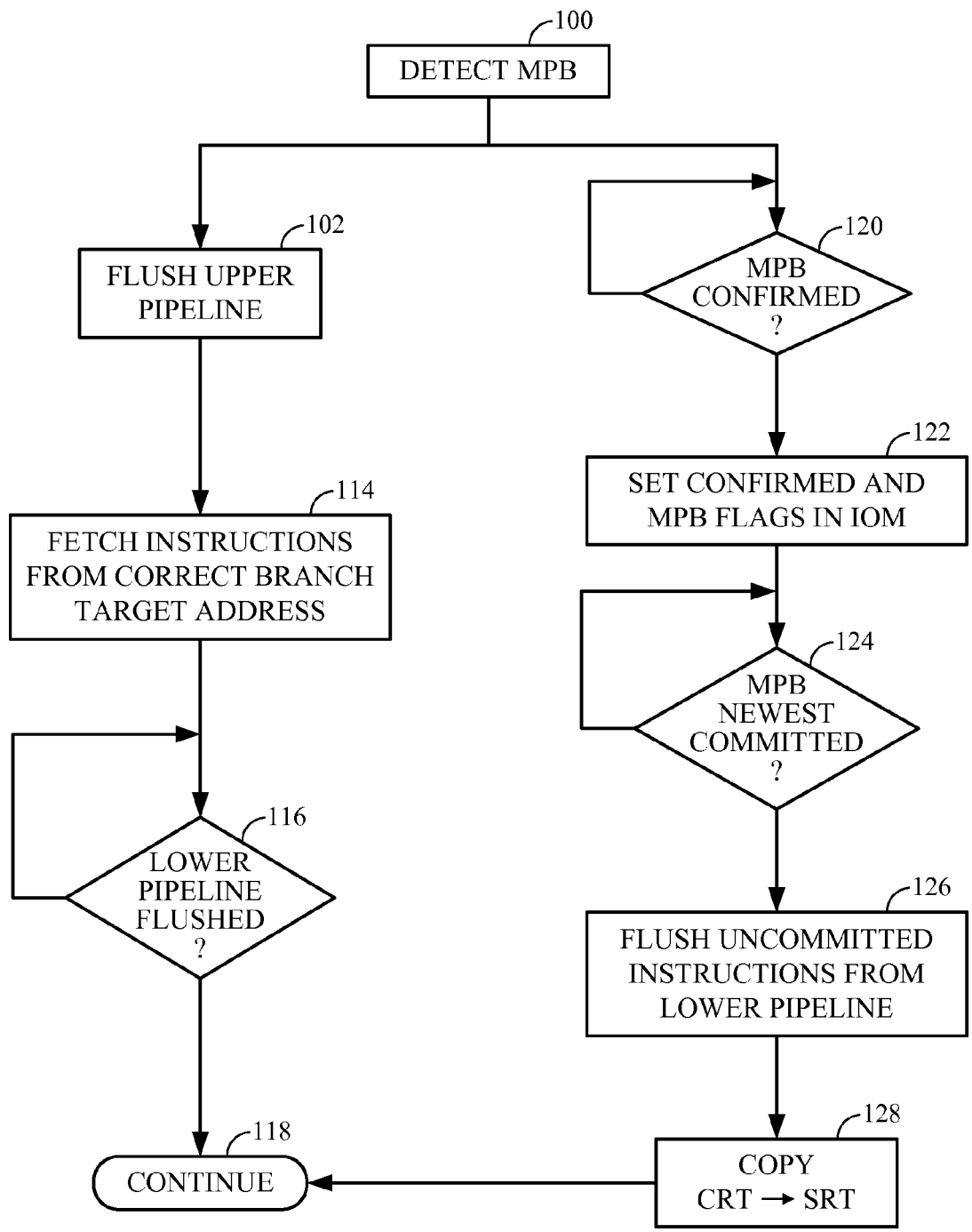
FIG. 2 is a flow diagram of a method of instruction execution in the processor of FIG. 1.

FIG. 2 depicts a method of executing instructions in a pipelined processor 10 that allows out of order execution, according to one or more embodiments. The relevant method begins when the processor 10 detects a mispredicted branch (MPB) (block 100). This will normally occur in an execute (EXE) stage in a lower pipeline 16a, 16b. Immediately upon detecting the MPB, the processor 10 flushes the upper pipeline 14 (102), such as in the following cycle, and begins fetching instructions from the correct branch target address (block 114). The processor 10 then places a hold on the upper pipeline 14 (block 116) until the lower pipeline 16 is flushed. When the hold is released, normal processor 10 execution continues (block 118).

In parallel, the processor 10 continues execution in the lower pipeline 16 until the MPB instruction confirms (block 120). This confirmation will normally occur in the pipe stage immediately following the detection of the branch misprediction. When the MPB instruction confirms (block 120), a confirmed flag and MPB flag are set in the IOM 13 (block 122). Normal processing continues until the MPB instruction commits. When the MPB instruction is the newest committed instruction (block 124), the IOM 13 triggers a flush of all uncommitted instructions from the lower pipeline 16 (block 126). The processor 10 then copies the CRT 24 to the SRT 22, and continues normal execution (block 118).

In this manner, embodiments achieve both an immediate flush of the upper pipeline 14, minimizing the delay in fetching instructions from the correct branch target address, and an efficient flush of the lower pipeline 16, avoiding complex computations and duplicative hardware to correctly flush only instructions fetched from the erroneous branch target address and to de-allocate processor resources speculatively allocated to them. Although embodiments have been described herein with reference to an IOM 13 that implements exception flushing, the present invention is not limited to these embodiments. In particular, an instruction tracking mechanism described herein to flush all uncommitted instructions from the lower pipeline 16 when a mispredicted branch instruction becomes the newest committed instruction need not also perform exception flushing. Furthermore, although the speculative allocation of processor resources 10 is described herein with respect to a register renaming scheme, numerous other forms of speculative resource allocation are known in the art, such as renaming buffers and the like.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A processor, comprising: control logic; and a segmented instruction execution pipeline comprising an upper pipeline prior to the point at which instructions may be out of program order and one or more lower pipelines beyond the point at which instructions may be out of program order; a General Purpose Register (GPR) file operative to dynamically associate GPR logical identifiers to physical registers, comprising: a plurality of physical registers; a Speculative Renaming Table (SRT) containing mappings of all current GPR logical identifiers to physical registers; and a Committed Renaming Table (CRT) containing mappings of GPR logical identifiers to physical registers only for instructions that have committed; wherein the control logic is operative to immediately flush all instructions from the upper pipeline upon detecting a mispredicted branch, to fetch instructions from a correct branch target address in the cycle following flushing the upper pipeline, to flush all uncommitted instructions from the lower pipelines upon committing the mispredicted branch instruction for execution, to copy the contents of the CRT to the SRT upon flushing all uncommitted instructions from the lower pipelines, to place a hold at the end of the upper pipeline following the upper pipeline flush, and to remove the hold upon flushing all uncommitted instructions from the lower pipelines; wherein the control logic includes an instruction ordering mechanism operative to track the confirmed and committed status of instructions, and further operative to flush all uncommitted instructions from the lower pipelines when the mispredicted branch instruction is the newest confirmed instruction; and wherein each lower pipeline that executes branch instructions includes a confirmation state operative to set a mispredicted branch indication in the instruction ordering mechanism when a branch instruction is determined to have been mispredicted.

* * * * *